(12) United States Patent
Monaghan et al.

(10) Patent No.: US 6,567,193 B2
(45) Date of Patent: May 20, 2003

(54) HOLOGRAM PRODUCTION TECHNIQUE

(75) Inventors: Brian J. Monaghan, Maple Glen, PA (US); Anthony W. Heath, Lansdale, PA (US)

(73) Assignee: Illinois Tool Works, Inc., IL (US)

( * ) Notice: Subject to any disclaimer, the term of this patent is extended or adjusted under 35 U.S.C. 154(b) by 0 days.

(21) Appl. No.: 10/008,193

(22) Filed: Nov. 6, 2001

(65) Prior Publication Data

US 2002/0054403 A1 May 9, 2002

Related U.S. Application Data

(63) Continuation of application No. 09/569,291, filed on May 11, 2000, now Pat. No. 6,388,780.

(51) Int. Cl.[7] .................................................. G03H 1/04
(52) U.S. Cl. ............................. 359/35; 359/1; 359/22; 359/25; 219/121.68; 219/121.69
(58) Field of Search ............................ 359/35, 1, 22, 359/25; 283/86; 430/1, 2; 219/121.68, 121.69, 121.78, 121.79, 121.8, 121.81

(56) References Cited

U.S. PATENT DOCUMENTS

| | | |
|---|---|---|
| 3,829,838 A | 8/1974 | Lewis et al. .............. 340/172.5 |
| 3,832,948 A | 9/1974 | Barker |
| 3,970,781 A | 7/1976 | Dalton et al. |
| 4,046,986 A | 9/1977 | Barker |
| 4,806,731 A | 2/1989 | Bragard et al. |
| 4,879,451 A | 11/1989 | Gart |
| 4,940,881 A | 7/1990 | Sheets |
| 4,959,275 A | 9/1990 | Iguchi et al. |
| 5,098,176 A | 3/1992 | Wolf ............................ 359/11 |
| 5,138,471 A | 8/1992 | McGrew ....................... 359/21 |
| 5,149,937 A | 9/1992 | Babel et al. |
| 5,198,636 A | 3/1993 | Suchan |
| 5,262,275 A | 11/1993 | Fan |
| 5,502,581 A * | 3/1996 | Sudo ............................ 359/10 |

(List continued on next page.)

FOREIGN PATENT DOCUMENTS

| | | |
|---|---|---|
| EP | 0 467 601 A2 | 7/1990 |
| GB | 2 133 574 | 9/1983 |
| GB | 2 151 066 | 12/1983 |
| GB | 2 215 078 | 2/1988 |
| GB | 2 222 696 | 7/1988 |
| GB | 2 271 648 | 10/1992 |
| GB | 2 335 288 A | 9/1999 |

OTHER PUBLICATIONS

N.A. Vainos et al., "Excimer laser use for microetching computer generated holographic structures", Applied Optics, 35(32), pp. 6304–6319, 1996.*
Alan Rhody and Franz Ross, "Holography Marketplace", Seventh Edition, (pp. 34–39).
N.A. Vainos, et al. "Excimer Laser Use For Microetching Computer–Generated Holographic Structures." Applied Optics, vol. 35, No. 32 Nov. 10, 1996 (6304–6319).

Primary Examiner—Mark A. Robinson
Assistant Examiner—Leo Boutsikaris
(74) Attorney, Agent, or Firm—Brown Rudnick Berlack Israels LLP

(57) ABSTRACT

A system for forming holographic pixels on the surface of a workpiece is disclosed. The system comprises a laser generating a laser beam; a beam splitter dividing the laser beam into a first beam and a second beam; a controller providing as output at least one control signal; and at least one beam deflector receptive of the first and second laser beams guiding the first and second laser beams along different paths to a prescribed pixel location on the surface of the workpiece, thereby combining the first and second laser beams at a prescribed azimuthal direction and included angle. At least one beam deflector is receptive of the at least one control signal thereby controllably deflecting at least one of the first laser beam and the second laser beam to the prescribed pixel location.

32 Claims, 11 Drawing Sheets

U.S. PATENT DOCUMENTS

| | | |
|---|---|---|
| 5,605,097 A | 2/1997 | Ruckl et al. |
| 5,633,105 A | 5/1997 | Jensen et al. |
| 5,698,351 A | 12/1997 | Fischer |
| 5,817,243 A | 10/1998 | Shaffer |
| 5,822,092 A | 10/1998 | Davis ............................ 359/10 |
| 5,892,597 A * | 4/1999 | Iwata ............................ 359/11 |
| 5,948,289 A | 9/1999 | Noda et al. |
| 6,043,913 A * | 3/2000 | Lu ................................ 359/25 |

* cited by examiner

HOLOGRAM PRODUCTION TECHNIQUE

CROSS REFERENCE TO RELATED APPLICATIONS

This application is a Continuation of U.S. patent application Ser. No. 09/569,291 filed on May 11, 2000 now U.S. Pat. No. 6,388,780 and entitled "Hologram Production Technique," claiming the benefit thereof.

TECHNICAL FIELD

The present invention relates to a technique for producing holograms, including both the apparatus for doing so and the method of utilizing that apparatus.

BACKGROUND

Various techniques for producing holograms are known. These generally involve creating interference patterns or gratings in a surface which, when viewed, give rise to holographic visual effects. The conventional way to make these interference patterns is to selectively expose to illumination regions of a photosensitive material (photo-resist), which becomes insoluble in the exposed regions. The unexposed regions are then dissolved away, leaving behind the desired pattern. This pattern can then be regarded as the final holographic image. More commonly, however, it is used as a "master" to mechanically impress an equivalent pattern onto a separate surface, which then provides the desired holographic effect. Various auxiliary operations are also commonly performed. For example, the master can be metalized to strengthen its surface before using it to make the separate mechanical impression or impressions. The final holographic surface can also be metalized to provide increased light reflectivity to the viewer. Also, the pattern of illumination exposure can be reversed, provided the photosensitive material is one which becomes soluble through exposure, rather than the reverse.

More recently, an additional feature has been added to these conventional techniques. This feature involves treating the overall holographic image as an aggregate of, separate areas, called pixels. The illumination of the photosensitive material is then performed one pixel at a time until the whole image area has been covered in this manner. By illuminating each pixel with appropriately directed interfering light beams, the holographic properties of individual pixels are determined. In turn, this pixel-by-pixel treatment has led to the use of computer programs to control both of the interfering directionality of the illumination and the locations of the individual pixels. This enables the production of holograms which are more susceptible to design variations through adjustment of the computer programming so as to create pixel arrays with various holographic characteristics. Such a computerized technique is disclosed in U.S. Pat. No. 5,822,092. The resulting hologram, which consists of an array of holographic pixels, or dots, is sometimes referred to as a "dot matrix" hologram.

Although this prior art technique has some desirable features, it is far from ideal in several respects. First and foremost, it still relies on the process of polymerization of the photosensitive material in creating the interference pattern, or grating at each pixel location. This is inherently time consuming and must, of course, be followed by separate processes for removing the unpolymerized portions of the material. Such removal typically involves so called "wet chemistry", which is another drawback. In addition, the technique requires the illumination to dwell on each pixel long enough for the polymerization process to become effective. That is not necessary if the illumination is performed, as was previously done, over large areas, or even over the whole image area at the same time.

The relatively time-consuming nature of this prior technique tended to discourage the creation of large-area holograms, and also the use of the initially created hologram as the final end product. Rather, it encouraged converting the initial creation into a master, for use in reproduction in the same manner as in prior non-pixel techniques.

Thus, any potential benefits of the computer-controlled pixel-by-pixel techniques are to a large extent negated. A major improvement over the technique described above is disclosed in prior U.S. patent application Ser. No. 09/021, 281, filed Feb. 10, 1998, which is assigned to the assignee of the present invention and is incorporated herein by reference as if set forth at length. In essence, this improvement resides in discarding the use of photosensitive material, which must be illuminated to polymerize selected areas, in forming the desired interference patterns. Instead, a laser is used to ablate a workpiece so as to directly form each pixel of the desired overall holographic image. No exposure of photosensitive material is required and no post-exposure treatment is needed to produce the desired pattern.

However, even this improved technique can be still further improved. The above-identified prior application teaches the use of an interferometer head, which splits the laser beam into at least two parts, and then uses a set of angled mirrors to reunite these parts at the surface of the workpiece on which the desired interference patterns are formed through ablation. The azimuthal orientations, $\alpha$, at which the two beam parts reach the workpiece surface determine the direction of viewing at which the strongest holographic effect is perceived. The included angle, $\beta$, between the beam parts reaching the workpiece determines the perceived holographic coloration. In order to produce different effects at different pixel locations, the azimuthal orientation of the whole interferometer head relative to the workplace surface has had to be changed intermittently and so did the angular orientation of the individual mirrors, which form part of this interferometer head. For example, if the viewing direction at which the strongest holographic effect from a given pixel is perceived (hereafter called the "maximum holographic direction") was to be changed by 90 degrees from one pixel to the next, then the whole interferometer also had to be reoriented in azimuth by 90 degrees. It is desired to make such changes very rapidly so as to enable the rapid formation of different holographic effects at consecutive pixel locations. This rapidity is especially crucial in the production of large area holograms by means of the pixel-by-pixel technique, since these require the formation of many individual pixels and therefore also potentially many changes in interferometer head orientation.

An interferometer head such as described above has substantial mass and inertia and is therefore difficult to reorient with the desire rapidity. Moreover, the mechanical movements, which are involved require precise location control and stability. As a practical matter, this limits the acceleration and deceleration rates for any head movement. Thus, the rate of creation of the different pixels which, in the aggregate, constitute the overall holographic imagery, becomes limited by the speed of reorientation movement of the interferometer head and its constituents. Thus, it is difficult to exploit the capability of the ablating laser in performing this pixel creation at the necessarily higher rates. Also, any vibration involved in these re-orientations can detract from the extremely high positional accuracy, which is desired in order to yield "good" holographic imagery.

SUMMARY

The present invention uses a laser beam to address a workpiece at predetermined locations so as to form holographic interference patterns in the workpiece. To create the desired interference patterns the laser beam is split into a reference beam and at least one object beam. These beams are directed by an optical system so as to reunite or interfere at a pixel location on the surface of the workpiece. The beams arrive at each such pixel from controllable azimuthal directions and with controllable included angles. Thus, the interfering beams produce pixels with controllable maximum holographic direction and controllable coloration.

One of the optical components which is involved in providing this control of direction and coloration, and which does not remain stationary during the pixel creation, is at least one beam deflector, such as the electronically controllable mirrors of a multi-axis galvanometer. These beam deflectors are computer controlled to produce the desired holographic effect at each pixel location.

The beam deflectors used in accordance with this invention have an inertia, which is very low. Therefore, the holographic effects produced at different pixels can be changed much more rapidly than was possible with the prior art technique using high-inertia interferometer heads. Also, in the present invention, the danger of optical misalignment, which existed in the prior art, is greatly reduced.

DESCRIPTION OF THE INVENTION

Figure 1:
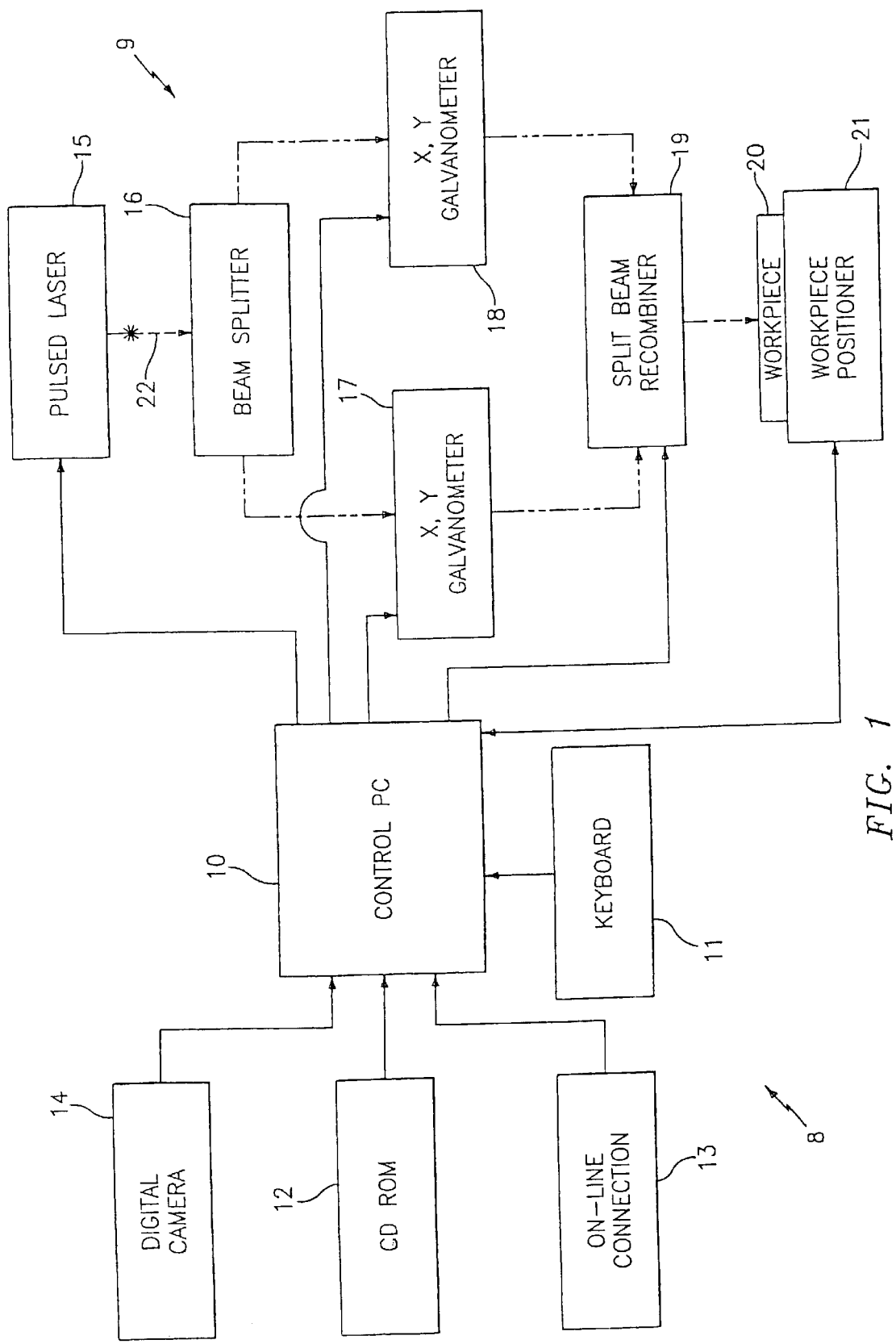
FIG. 1 is a simplified block diagram of an over all system embodying the present invention.

Certain terminology is used in the following description for convenience only and it not limiting. The words "right," "left," "lower", "upper", "vertical" and "horizontal" designate directions in the drawings to which reference is being made and are intended only to aid in the description of the preferred embodiments. The terminology includes the words specifically noted above as well as derivatives thereof and words of similar import. Additionally, the words "a" and "one" are understood to mean one or more of the designated item unless specifically noted.

Referring to FIG. 1, the overall system 8 for producing holograms includes a system controller, such as a personal computer (PC) 10, which is supplied with programming from at least one of several possible sources. These sources may include a keyboard 11, a CD-ROM 12, an on-line connection 13, and/or a digital electronic camera 14, or any other similar devices known to those skilled in the art. In response to such programming, the controller 10 supplies control signals to the controllable elements of the system 8 of FIG. 1. The major controllable elements 9 of the system 8 include a laser 15, a beam splitter 16 receptive of the beam 22 from laser 15, beam deflectors such as a pair of two-axis galvanometers 17, 18, a split beam recombiner 19 and a workpiece positioner 21. The laser 15 may be a pulsed Nd:YAG laser wherein the fourth harmonic of the basic frequency of such a Nd:YAG laser is utilized to ablate the surface of workpiece 20. However, it will be recognized by those skilled in the art that other types of lasers may be used, depending on the nature of the surface of the workpiece.

It is noted that some of the connections between elements in FIG. 1 are shown in solid lines, while others are shown in broken lines. The former represent electrical connections, and the latter represent a laser beam traveling between elements. This is also used in the other figures of drawings.

Figure 2:
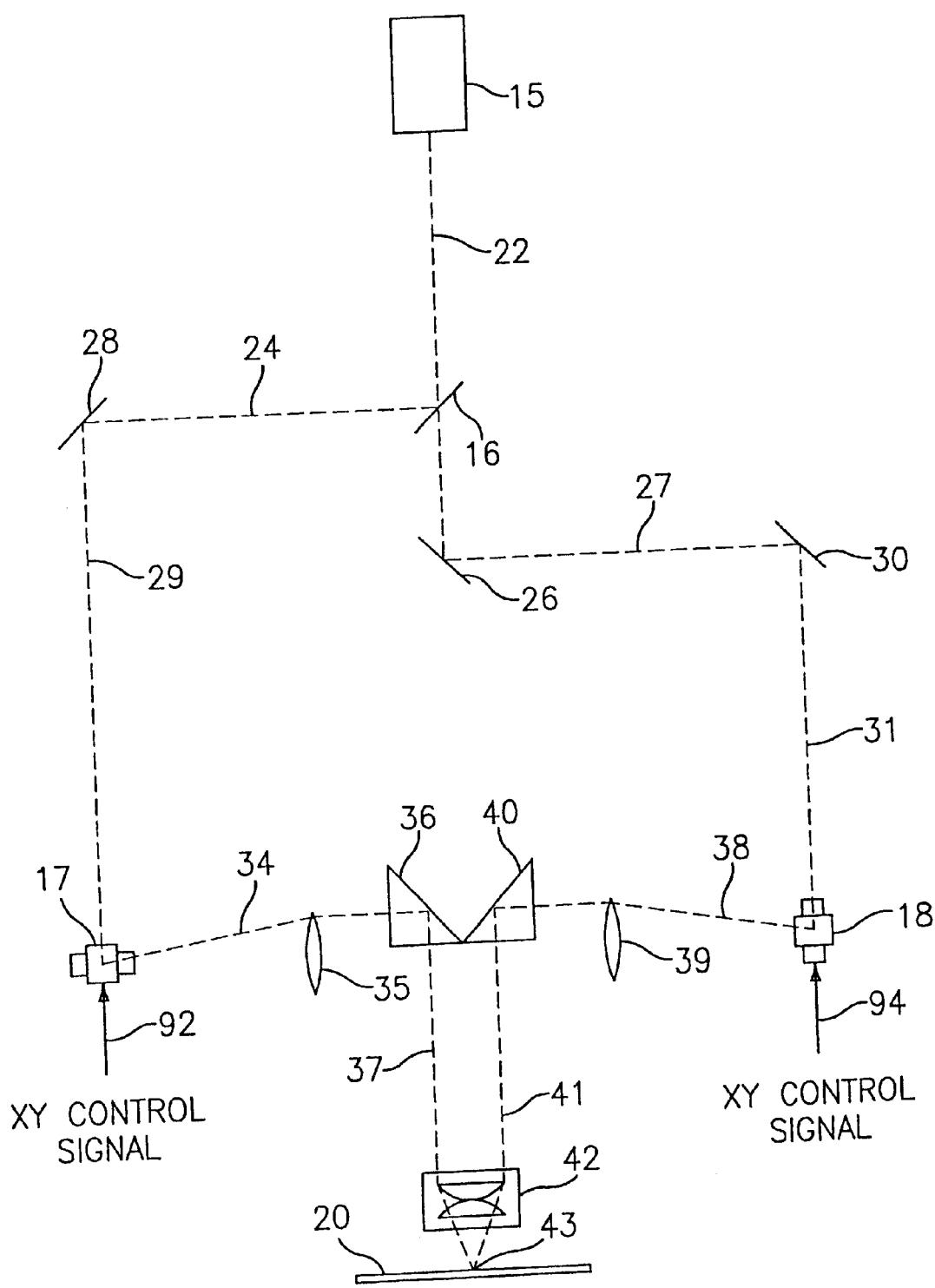
FIG. 2 is a diagrammatic elevation of an embodiment of the optics of the system of FIG. 1.

Turning now to FIG. 2, this shows an elevation of the optics for the system 9 of FIG. 1. In FIG. 2, the beam 22 from the pulsed laser 15 is shown directed to the beam splitter 16, which may consist of a conventional dichotic beam splitter. The beam splitter 16 is positioned so as to direct a first split half of the beam 22 along path 24, while permitting a second half of the beam 22 to continue on a to a mirror 26. Mirror 26 then directs the second half beam along line 27. From the present disclosure it will be understood by those skilled in the art that the reference to a "split half of the beam" or "beam half" is not intended to indicate that the beam is precisely equally divided, but is intended only to identify the two split components of the beam. The magnitude or intensity relationship between the two beam halves can deviate from equality, the effect being a progressive dilution of the produced holographic effect.

The path 24 leads to a mirror 28, which directs the first beam half along a path 29, preferably at right angles to path 24. On the opposite side, path 27 leads from mirror 26 to a mirror 30 which in turn directs the second beam half along path 31, preferably at right angles to path 27 and parallel to path 29. Path 29 leads to a first electronically controllable X, Y galvanometer 18 (see FIG. 1). By "X, Y galvanometer" is meant a galvanometer whose mirrors are so constructed and positioned that they can be driven by appropriate electrical control signals, to controllably deflect a beam of light in an X, Y coordinate system. Other coordinate systems may also be used. For convenient reference in the description which follows, directions are designated herein as "X" and "Y" respectively (see also FIG. 3), and the galvanometers themselves are correspondingly designated in FIG. 1 as X, Y galvanometers 17, 18. Such currently preferred galvanometers are available under Model No. 6800 HP from Cambridge Technology of Cambridge, Mass. However, other suitable galvanometers may be utilized, if desired.

In the preferred embodiment, the paths of the beam halves 34 and 38 exiting from the X, Y galvanometers 17, 18 are generally perpendicular to their respective arrival paths 29, 31 and may be directed oppositely to each other. Since FIG. 2 is two-dimensional, deflections of beams 34 and 38 into and out of the figure cannot be illustrated in FIG. 2.

Referring still to FIG. 2, the beam 34, as deflected by galvanometer 17 passes through a first collimating lens set 35 to a first beam deflecting mechanism 36 such as a prism or a mirror where it is redirected along path 37 at right angles to its arrival path from collimating lens set 35. The beam half 38, as deflected by galvanometer 18, passes through a second collimating lens set 39 to a second beam deflecting mechanism 40, also such as a prism or a mirror, where it is redirected along a path 41, which parallels the redirected path 37.

Paths 37 and 41 are directed toward a condensing lens system 42, (which corresponds to the recombiner 19 of FIG. 1) and may be comprised of one or more separate lenses directing the first and second beam halves from paths 37 and 41 to a common focal point 43. This focal point 43 is at the location of a pixel on the workpiece 20 forming thereby part of the hologram produced by the inventive technique.

Preferably, the beam splitter 16, the first, second and third mirrors 26, 28 and 30, the X. Y galvanometers 17, 18 the first and second collimating lens sets 35 and 39 and the first and second beam deflecting mechanisms 36 and 40 are all mounted on a common support frame (not shown), in order to accurately maintain the positions of these optical components. These components may be fixed mounted or, preferably, mounted in adjustable holders so that the optical components can be initially aligned after first assembly. However, once these components have been aligned, they can then remain stationary, notwithstanding changes in the azimuthal direction, $\alpha$, or the included angle, $\beta$, of the beam halves re-united at pixel location 43. These changes are all created by the deflection of beam halves 34 and 38, through electronic control of the X, Y galvanometers 17, 18.

Figure 9:
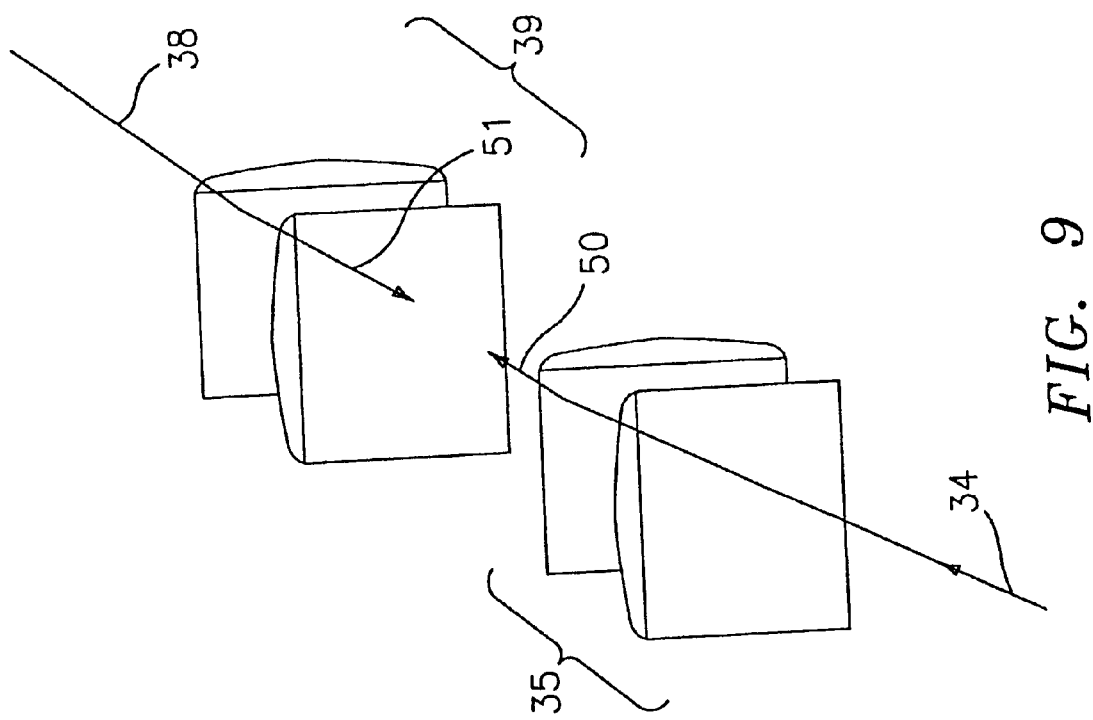
FIG. 9 is a perspective representation of a pair of collimating lens sets for collimating a pair of laser beams in an X, Y coordinate system.

Referring still to FIG. 2, the beam 34, as deflected by galvanometer 17, passes through a first collimating lens set 35 to the first beam deflector 36 where it is redirected along path 37 at right angles to its arrival path from collimating lens set 35. As best understood from FIG. 2, the collimating lens set 35 may comprise a lens set such as a pair of cylindrical lenses oriented at right angles with respect to one another as shown in FIG. 9. The beam half 38, as deflected by galvanometer 18, passes through a second collimating lens set 39 to the second beam deflector 40 where it is redirected along path 41, which parallels the redirected path 37 from the first beam deflector 36. As best understood from FIG. 2, the collimating lens set 39 may comprise a lens set such as a pair of cylindrical lenses oriented at right angles with respect to one another as shown in FIG. 9.

Figure 3:
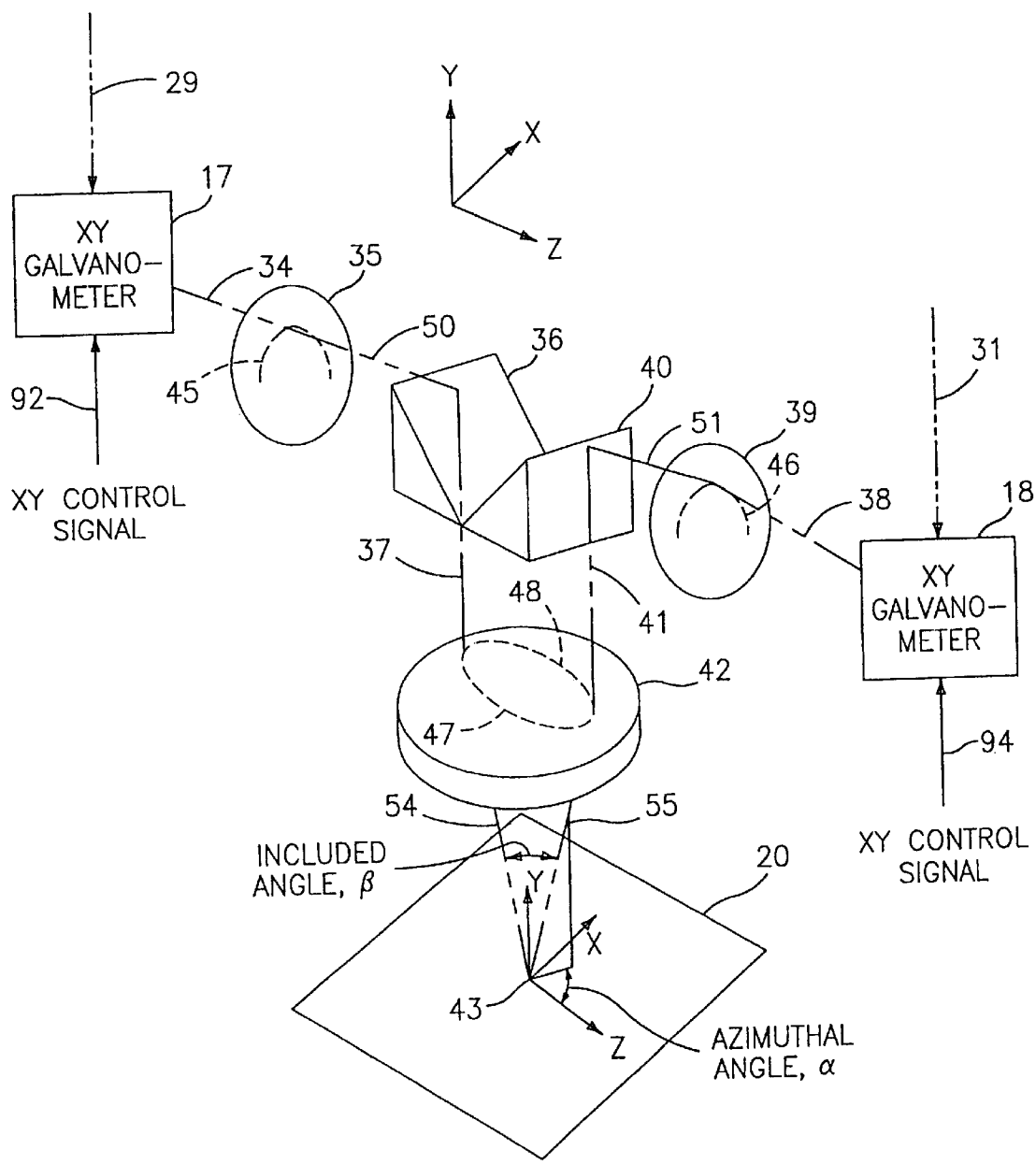
FIG. 3 is a partly isometric view of a portion of these optics, which diagrammatically illustrates how the laser beam halves are controlled to reach the workpiece at controllable azimuths and at controllable included angles.

FIG. 3, to which reference may now be had, illustrates more fully how the optical components of the invention cooperate to produce holographic pixels with controllable maximum viewing directions and colorations. In FIG. 3, there are shown some of the same optical components as in FIG. 2, namely collimating lens sets 35 and 39, beam deflectors 36 and 40, and condensing lens system 42, but drawn to a somewhat different scale and in a quasi-three dimensional (isometric) presentation.

In addition to the above, FIG. 3 shows a set of dotted-line semi-circles 45, 46, 47, 48. Semi-circles 45 and 46 represent the locus of points of intersection between beam halves 34 and 38, as deflected by the respective X, Y galvanometer 17, 18, and lens sets 35 and 39. Likewise, semi-circles 47 and 48 represent the locus of points of intersection between beam halves 37 and 41, as deflected by the respective X, Y galvanometer 17, 18, and lens sets 35 and 39.

More specifically, by applying appropriate electronic control signal 92 to X Y galvanometer 17, beam half 34 can be deflected so that it passes through collimating lens set 35 at any desired point on locus 45. Beam half 38, on the other hand, can be deflected so that it passes through collimating lens set 39 at any desired point on locus 46. Each so deflected beam half then continues to beam deflector 36, 40 (beam deflector 36 for beam half 50 and beam deflector 40 for beam half 51). These continuing beam halves are designated in FIG. 3 by reference numerals 50 and 51 respectively. Each of the two beam deflectors 36 and 40 functions to redirect by 90 degrees the respective beam halves 50, 51. The resulting beam halves exiting these prisms are designated in FIG. 3 by reference numerals 37 and 41, respectively.

In arriving at condensing lens system 42, these redirected beam halves 37, 41 can again be located at various points on semi-circular locii 47, 48, respectively, depending upon the deflections previously imparted to beam halves 34, 38 by X, Y galvanometers 17, 18 in response to applied electronic control signals 92, 94.

Semi-circular locii 45 and 46 are in parallel, laterally spread-apart planes and have their curvatures in the same direction. In contrast, semi-circular locii 47 and 48 are in a common plane and have their curvatures in opposite directions. In fact, by reasonably careful implementation and adjustment of the optical components discussed so far, these semi-circular locii 47 and 48 can be positioned close enough to each other so that they resemble the two halves of a complete circle.

Beam halves 37, 41 pass through condensing lens system 42, becoming beam halves 54, 55 which converge at pixel location 43. This pixel will therefore have a maximum holographic direction determined by the azimuthal locations on locii 47 and 48 from which these converging beam halves 54, 55 originate.

The locations on loci 47 and 48 at which beam halves 37, 41 arrive at the condensing lens system 42 can be changed at will by the simple expedient of appropriately adjusting the electronic control signals 92, 94 applied to X, Y galvanometers 17, 18. In turn, such changes will change the azimuthal directions, $\alpha$, from which beam halves 54 and 55 reach pixel location 43, and therefore also the maximum holographic direction of that pixel.

As for the pixel coloration, the radii of semi-circular loci 47 and 48 can also be changed at will, by appropriately adjusting the values of the electronic control signals 92, 94 applied to X, Y galvanometers 17, 18. In turn, such changes will change the included angle, $\beta$, between beam halves 54 and 55 reaching pixel location 43, and thereby also the holographic coloration of that pixel.

Thus, the invention enables the complete control of both of the pixel parameters, $\alpha$ and $\beta$, by the appropriate control of the mirrors of the two X, Y galvanometers 17, 18.

That the inventive technique is much freer from the problem of high inertia found in the prior art is believed to be self-evident, since galvanometers are inherently low inertia devices. However, this is also empirically confirmed. Using the prior art interferometer head, the production by the dot matrix techniques of a hologram with a surface area of, say, about 40×40 inches typically required at least about 72 hours. In striking contrast, such production using the inventive technique can be accomplished in as little as 3 hours: a 24 to 1 improvement in the speed of hologram production.

It will be understood that, during production of a hologram using the inventive technique, the workpiece is displaced relative to the optics, or vice versa, and the X, Y galvanometers are electrically controlled so that the desired holographic pixels are produced at locations determined by this relative displacement.

In order to prevent impairment of the holographic effect produced by the invention, it is desirable to prevent defocusing of the reunited beam halves due to small, unintended variations in the optimum distance between the condensing lens system 42 and the surface of the workpiece 20 upon which the holographic pixels are to be formed. Such variations can stem from simple irregularities in the surface of the workpiece. Therefore, means are preferably provided to maintain that distance constant. This may comprise a "follower", (not shown) riding on the surface of the workpiece 20 and detecting any distance variation, plus means for moving the lens system 42 toward or away from the surface 44 in a compensating manner. However, such distance compensating movement does not determine either the maximum holographic direction or the coloration of the pixels. Therefore, the statement made previously in this application still applies, namely that the only non-stationary elements, which determine those parameters are the low inertia X, Y galvanometers 17, 18.

To form each pixel in accordance with the present invention, the material of workpiece 20 is addressed by means of the two interfering laser beam halves at the desired pixel locations. The pixel formation at different pixel locations is readily achieved by displacing the workpiece 20 in mutually orthogonal directions relative to the focal point 43 (FIGS. 2 and 3), e.g. by so moving the target positioner 21 (see FIG. 1) or the optics. These movements are coordinated by the controller 10 directing the mirrors of the X, Y galvanometers 17, 18 so as to produce the holographic pixels at the desired locations. The workpiece 20 may be flat or cylindrical and rotated about the cylinder's axis while moving it along that axis. In each case, what is needed is relative displacement of focal point 43 and workpiece 20. This relative displacement can alternatively be accomplished by appropriately moving the whole optics assembly shown in FIGS. 2 and 3 or moving the workpiece 20.

Figure 4:
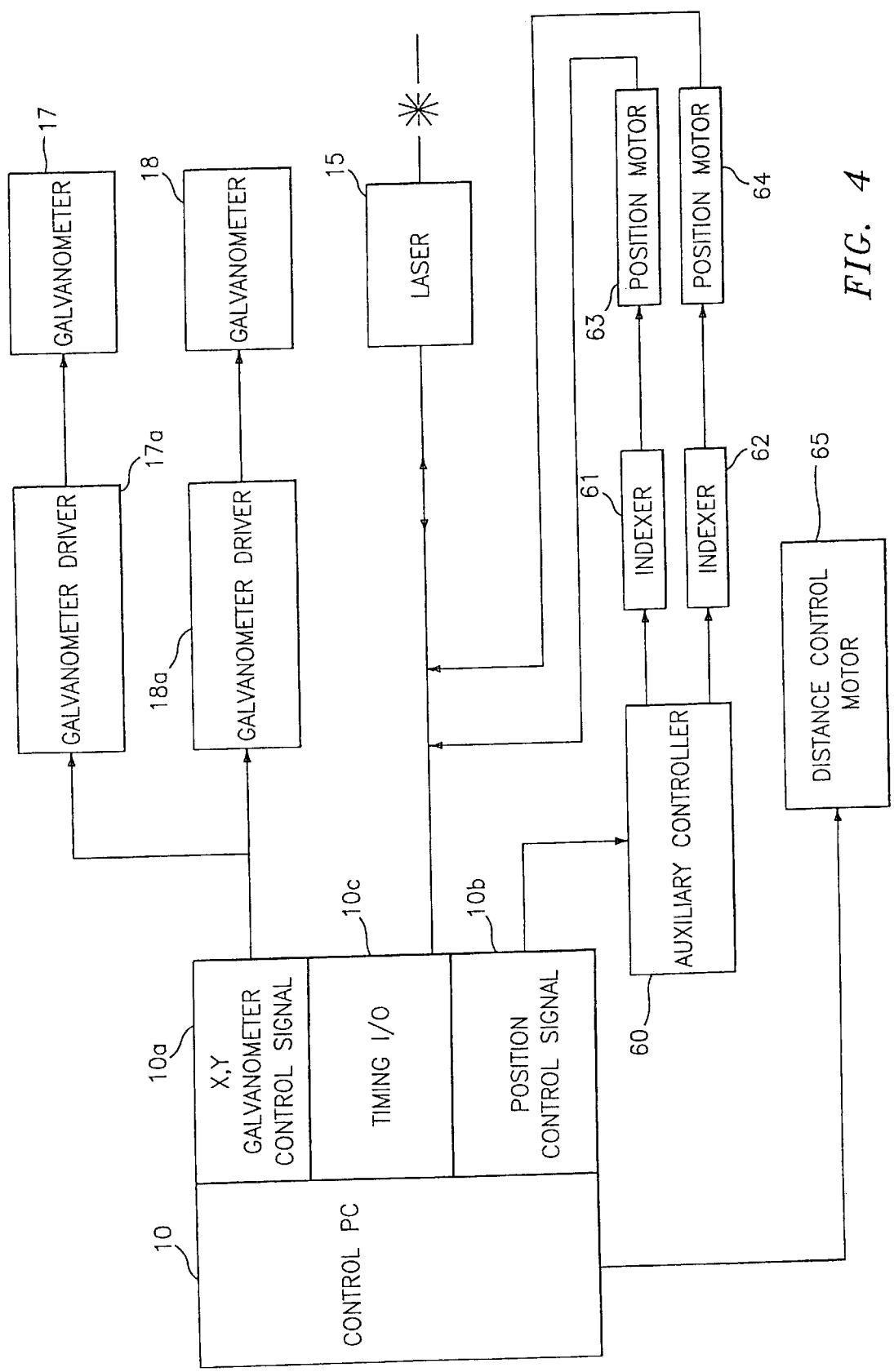
FIG. 4 is a block diagram of a preferred embodiment of the controls for the system of the invention.

Referring now to FIG. 4, this shows a more detailed block diagram of the preferred arrangement for the controller of the X, Y galvanometers 17, 18, the laser 15, the workpiece positioner 21 and the condensing lens system 42. The controller 10 generates an X, Y galvanometer control signal, as shown by block 10a, which is transmitted to the galvanometer drives 17a and 18a. The galvanometer drivers output the control signals for the desired X, Y beam deflections (FIG. 3). The controller 10 also generates a workpiece positioner control signal, as shown by block 10b, for the positioner 21 (FIG. 1) to place the workpiece 20 such that the focal point 43 (FIG. 3) for a given pixel is in the desired location. This can be done utilizing a separate motion control card in the controller 10 or via a driver program. This signal is transmitted to an auxiliary controller 60, which drives two indexers 61, 62 for the mutually perpendicular motion control of the workpiece positioner 21. The indexers 61, 62 drive two positioning motors 63, 64 respectively. The position signals for motors 63, 64 are also used to activate the laser 15 when these motors are stopped with the workpiece at a desired pixel location, as determined by the timing input/output signal in block 10c.

The previously mentioned control of distance between the condensing lens 42 and the workpiece 20 is also preferably provided at 100 by the controller 10. This controls a motor 65 to move the position of the condensing lens 42 in the direction toward or away from the workpiece 20, as appropriate. It should be noted that control of this distance may also be accomplished by manual adjustment when the distance from the condensing lens 42 to the workpiece remains constant, such as when the workpiece, or series of workpieces, are small flat sheets upon which holograms are to be formed. In that case the motor 65 could be omitted.

It will be understood that numerous changes may be made in the implementation of the inventive technique, without departing from its basic concepts. For example, in place of the X, Y galvanometers 17, 18 there may be used other low-inertia two-axis beam deflectors.

Figure 5:
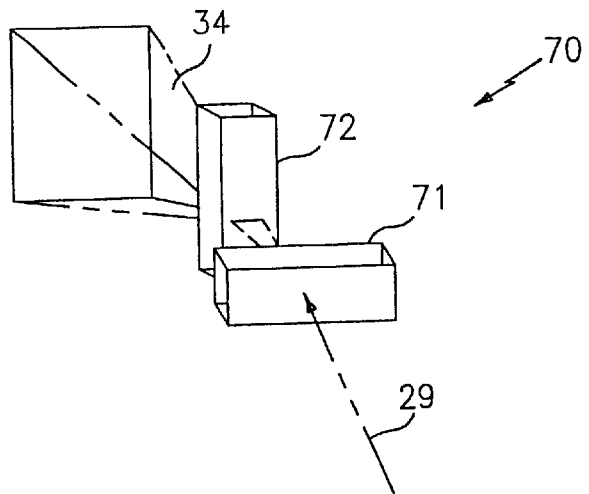
FIG. 5 is an isometric view of a second embodiment of a two-axis beam deflecting means usable in the system of the present invention.

FIG. 5 to which reference may now be made, shows another embodiment of such a beam deflector designated by reference numeral 70. Two such deflectors 70 are provided in accordance with the invention. One is used in place of galvanometer 17 and the other is used in place of galvanometer 18 for controllably deflecting the beam halves 29 and 31 onto the collimating lenses 35, 39. These beam deflectors 70 comprise acousto-optic crystals 71, 72 in an X, Y configuration, which deflect the beam halves arriving along paths 39 and 31, respectively, in the same manner as galvanometers 17, 18 in response to control signals from controller 10. Such deflectors 70 are available from NEOS Technologies Inc. of Melbourne, Fla. 32904.

Figure 6:
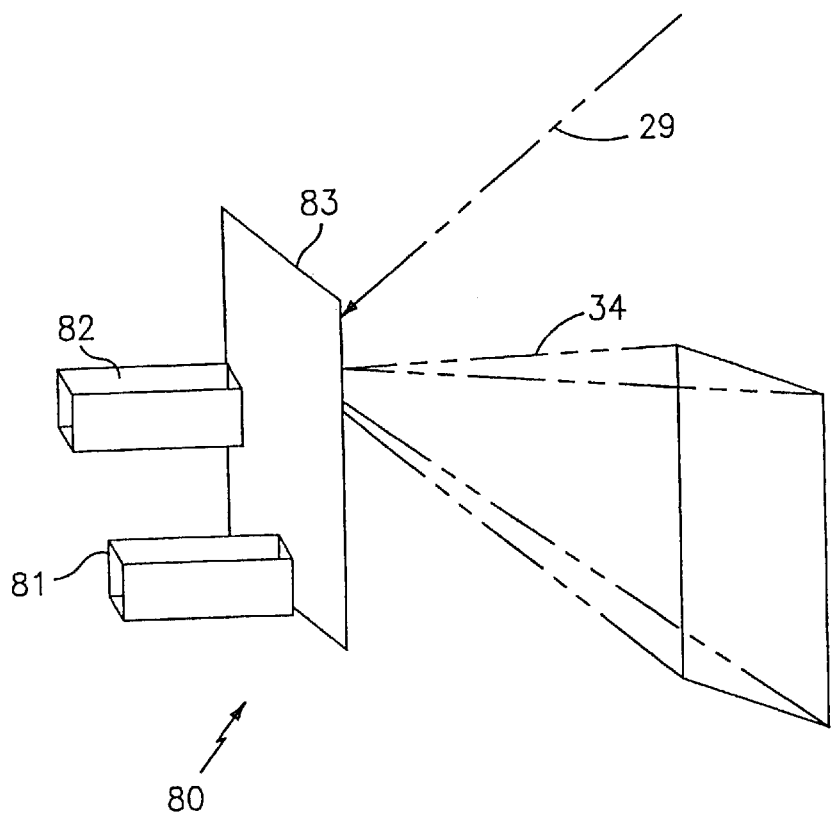
FIG. 6 is a isometric view of a third embodiment of a two-axis beam deflecting means usable in the system of the present invention.
Figure 7:
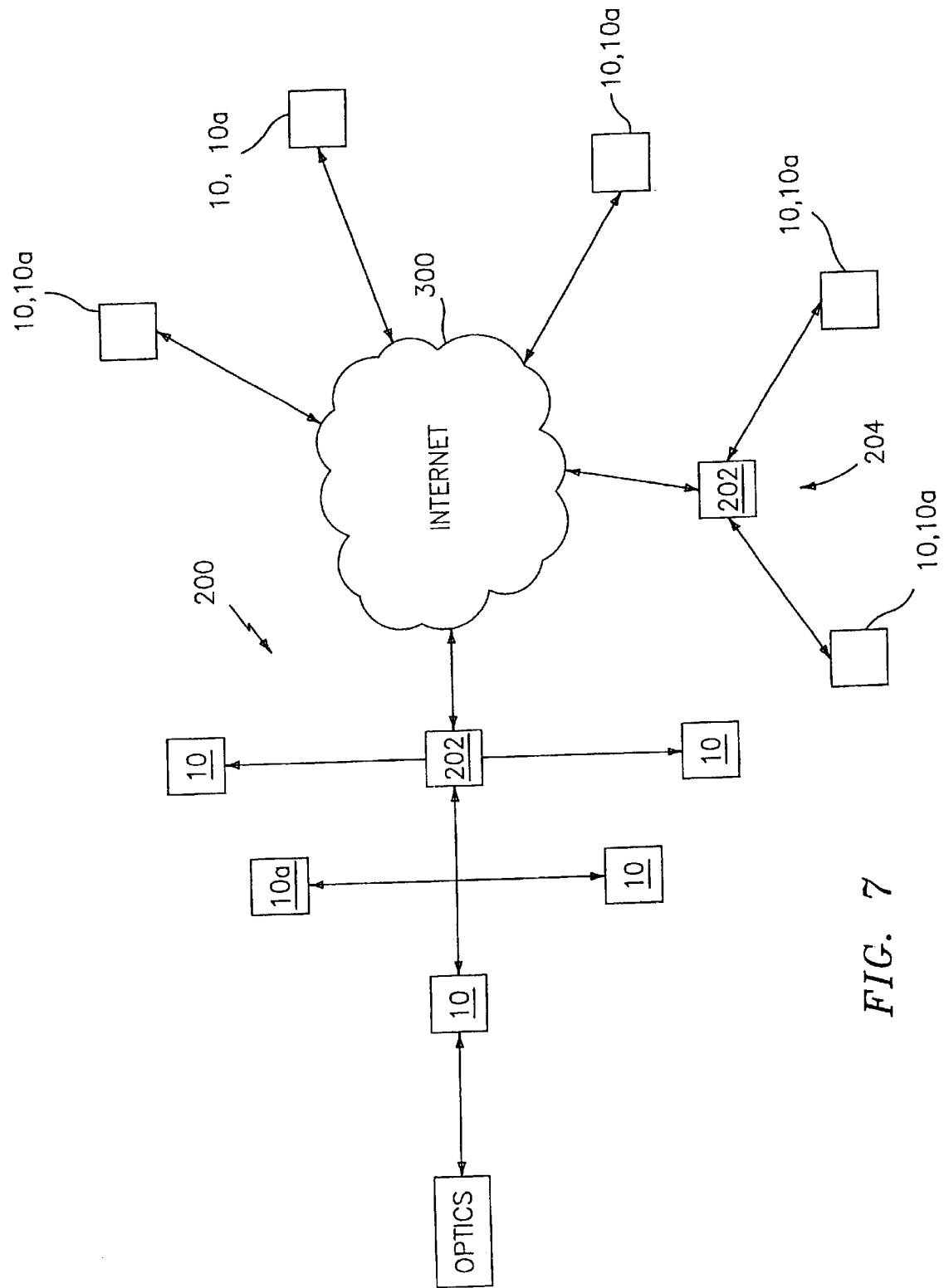
FIG. 7 is a schematic representation of the system embodying the present invention connected to a distributed computer or communications network.

Still another embodiment of a suitable two-axis beam deflector is shown in FIG. 6, designated by reference numeral 80. Two such beam deflectors 80 are provided. One is used in place of galvanometer 17 and the other in place of galvanometer 18 for controllably deflecting beam halves 29 and 31 onto the collimating lenses 35, 39, respectively. These beam deflectors 80 comprise two piezo-electronic transducers 81, 82, which are used to tilt a mirror 83 in two mutually perpendicular directions. These piezo-electronic transducers are controlled by the controller 10 so as to properly position the mirror 83. Such deflectors 80 are available from Inetic Ceramics, Inc., Hayward, Calif. 94595.

Figure 8A:
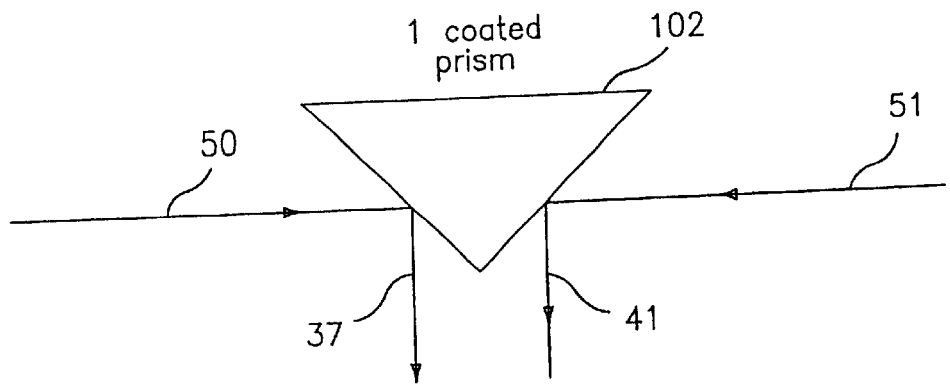
FIGS. 8A–8C show alternate embodiments of the prism for redirecting a light beam.
Figure 8B:
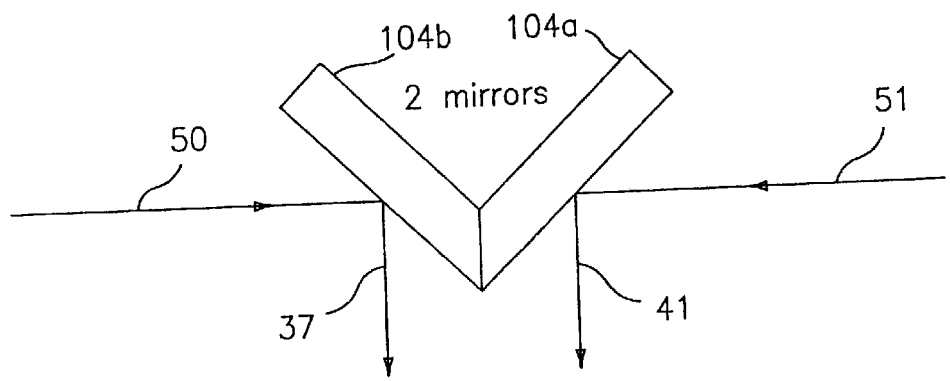
Figure 8C:
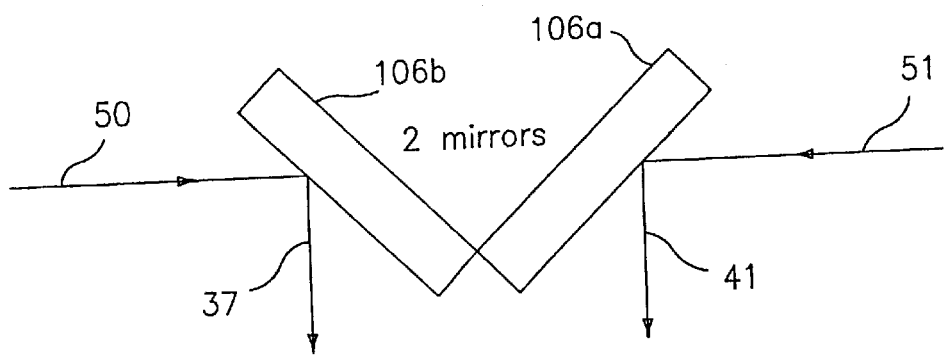

Still other possible modifications involve replacing prisms 36 and 40 with a single prism as seen in FIG. 8 having a reflective coating on its outer surface, or with face coated mirrors, or with other types of reflectors to achieve the 90 degree redirection of the two mirror image beam halves 50, 51 which has been previously described. Also galvanometers 17, 18 could be placed at different locations, such as at the locations of mirrors 28 and 30, provided that the beam halves continue to be deflected and recombined to form the required interference pattern at the pixel location 43.

By controlling both of the beam deflecting means, such as X, Y galvanometers 17, 18, with the same signals, the beam halves 54, 55, which are reunited at the pixel locations, will arrive there from diametrically opposite orientations. However, it is also possible to use control signals, which are different from each other at the beam deflecting means. This will cause the reuniting beam halves 54, 55 to arrive from orientations, which are no longer diametrically opposite to each other. Of course, the resulting maximum holographic directions of a given pixel will still be at orientations, which bisect the angles between the orientations of the reuniting beam halves 54, 55.

Still other possible modifications involve replacing prisms 36 and 40 with a single prism (at 102 in FIG. 8A)

having a reflective coating on its outer surface, or with face coated mirrors (at 104a 104b in FIG. 8B and 106a, 106b in 8C), or with other types of reflectors to achieve the 90° redirection of the two mirror image beam halves 50, 51 which has been previously described.

Figure 10A:
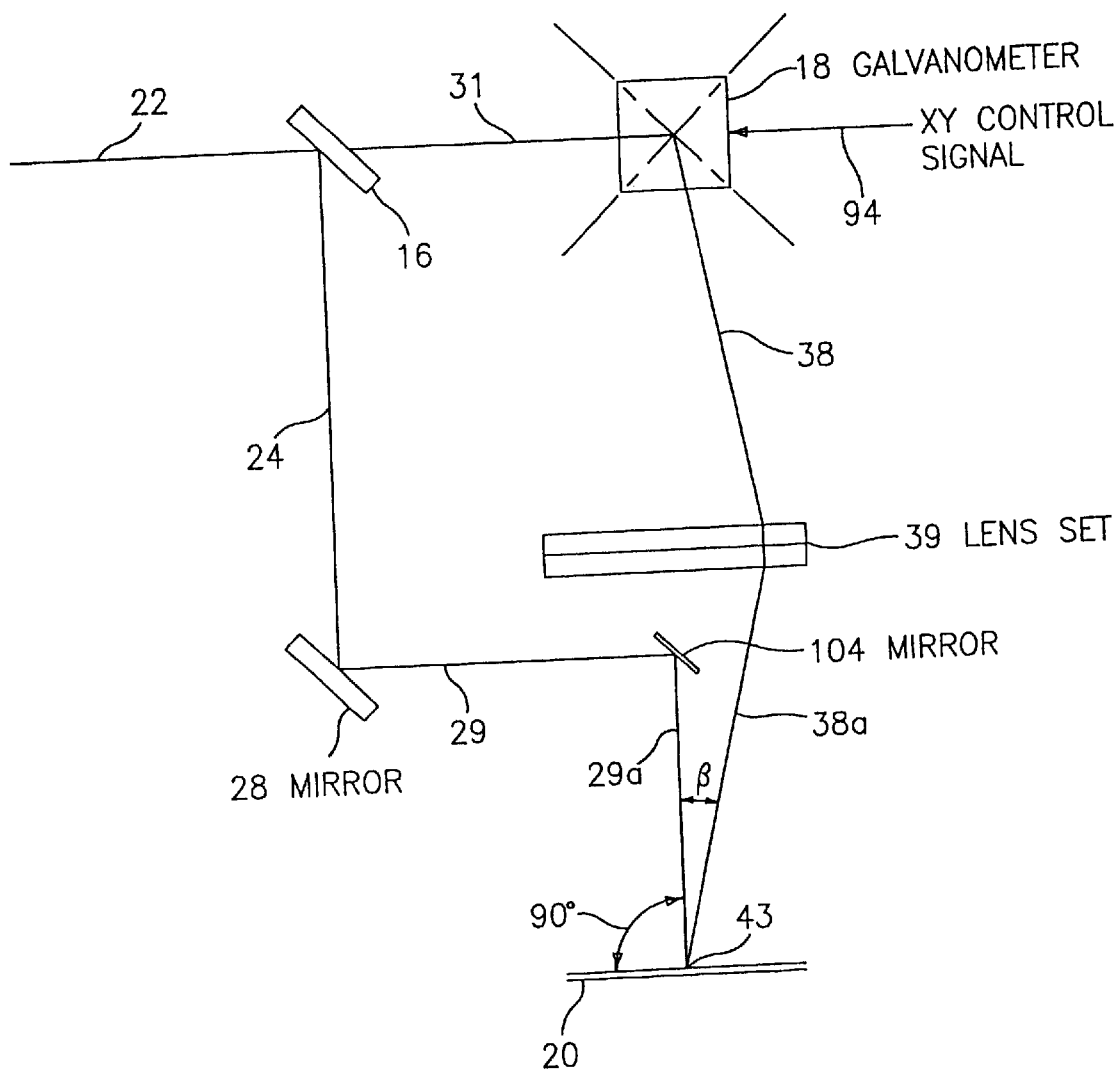
FIG. 10A is first schematic representation of the optical apparatus having a single galvanometer.

Referring to FIG. 10A, the arrangement of the optical components of the present invention may comprise one galvanometer 18 receptive of a first split laser beam 31, which is redirected as output beam 38. The output beam 38 is in turn focused by the focusing lens set 39 to the pixel location 43 on the workpiece 20. A second split laser beam 24 is redirected via mirrors 28 and 104 to the workpiece 20 to combine with the focused beam 38a at the pixel location 43 at a prescribed azimuthal direction, α, and included angle, β.

Figure 10B:
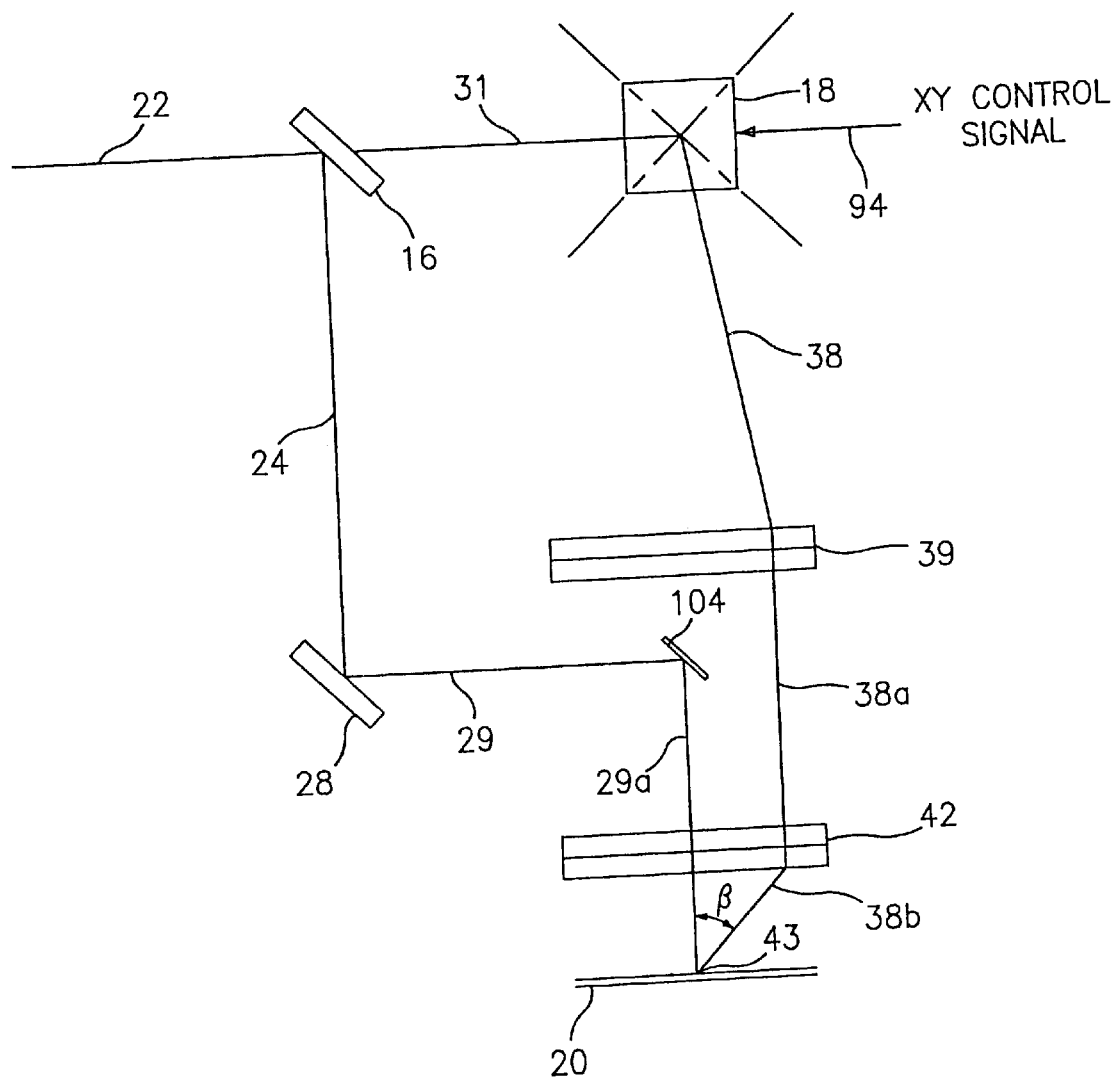
FIG. 10B is second schematic representation of the optical apparatus having a single galvanometer.

Referring to FIG. 10B, the arrangement of the optical components of the present invention may comprise one galvanometer 18 receptive of a first split laser beam 31, which is redirected as output beam 38. The output beam 38 directed to collimating lens set 39 where upon it exits as collimated beam 38a. Collimated beam path 38a is in turn focused by the focusing lens set 42 to the pixel location 43 on the workpiece 20. A second split laser beam 24 is redirected via mirrors 28 and 104 to the workpiece 20 to combine with the focused beam 38b at the pixel location 43 at a prescribed azimuthal direction, α and included angle β.

Figure 11:
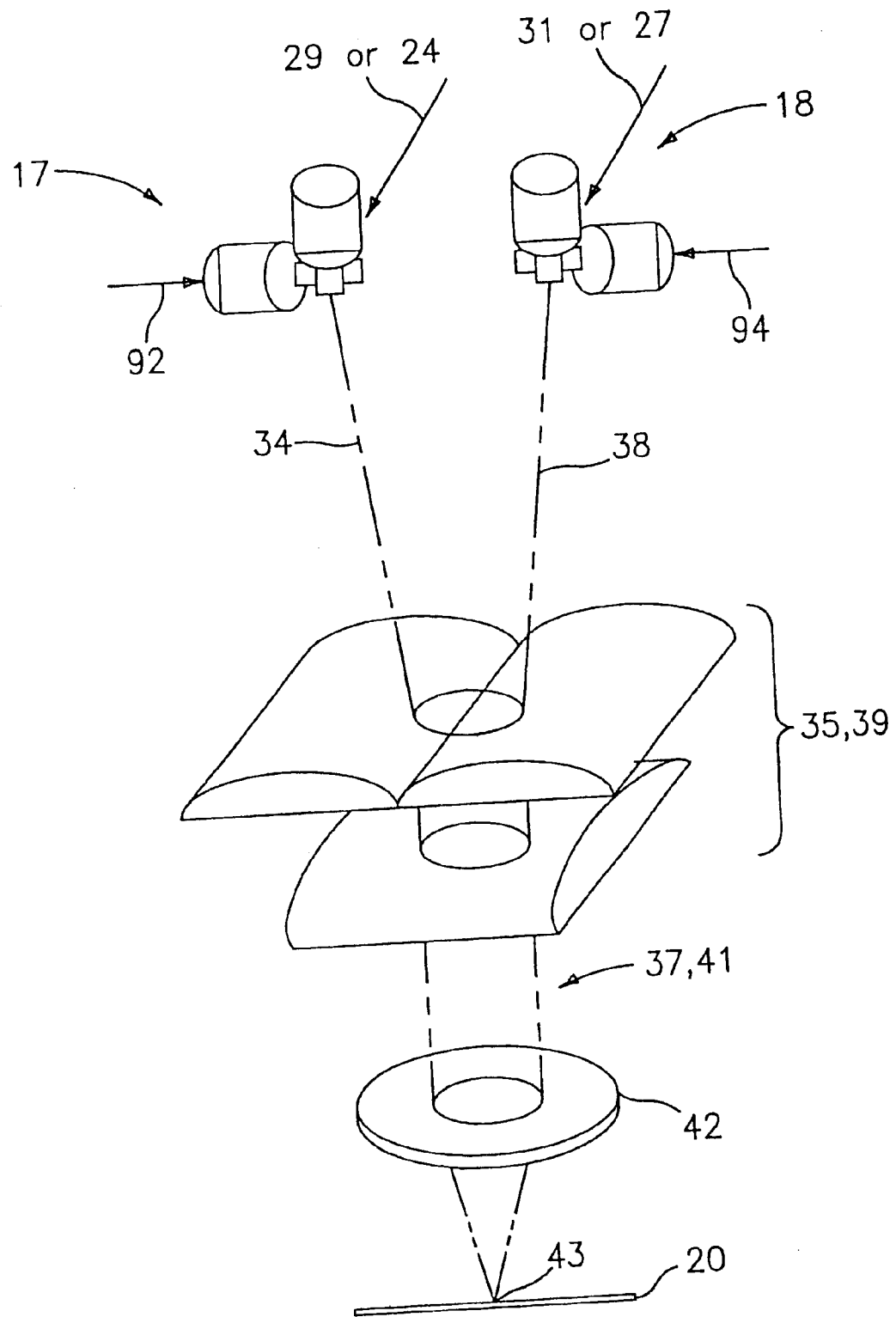
FIG. 11 is schematic representation of the optical apparatus wherein the output laser beams from the galvanometers are guided directly to the workpiece through a collimating lens set.

Referring to FIG. 11, the arrangement of the optical components of the present invention may comprise the galvanometers 17, 18 receptive of the first and second split laser beams 29, 31 which are redirected as output beams 34, 38 to the collimating lens set 35, 39. The collimating lens set 35, 39 collimates the beam paths 34, 38 as in FIGS. 3 and 9 and provides as output the collimated beam paths 37, 41 directed to the focusing lens set 42 whereupon the beams 37, 41 are focused to the pixel location 43 at a prescribed azimuthal direction, α, and included angle, β.

Still other modifications could be made to the disclosed embodiments by those skilled in the art without departing from the present inventive concept. It is understood, therefore, that the invention is not limited to the particular embodiment disclosed, but is intended to cover modifications within the spirit and scope of the present invention as set forth in the appended claims.

What is claimed is:

1. A system for ablating holographic pixels on the surface of a workpiece, the system comprising:

a laser generating a laser beam;

a beam splitter dividing the laser beam into a first laser beam and a second laser beam;

a controller providing as output at least one control signal; and at least one beam deflector receptive of the first and second laser beams guiding the first and second laser beams along different paths to a prescribed pixel location on the surface of the workpiece, thereby combining the first and second laser beams at a prescribed azimuthal direction and included angle;

wherein at least one beam deflector is receptive of the at least one control signal thereby controllably deflecting at least one of the first laser beam and the second laser beam to the prescribed pixel location.

2. The system as set forth in claim 1 wherein the laser comprises a Nd:YAG laser.

3. The system as set forth in claim 1 wherein the at least one beam deflector receptive of the at least one control signal comprises at least one mirror controllably positioned to deflect the first laser beam or the second laser beam in a prescribed coordinate system.

4. The system as set forth in claim 1 wherein at least one other beam deflector of the at least one beam deflector receptive of the first and second laser beams includes a mirror fixed about the axes thereof to deflect the first laser beam or the second laser beam in a prescribed coordinate system.

5. The system as set forth in claim 1 further comprising a focusing element for focusing at least one of the first laser beam and the second laser beam to the prescribed pixel location.

6. The system as set forth in claim 5 further comprising a collimator for collimating the paths of at least one of the first laser beam and the second laser beam.

7. The system as set forth in claim 6 wherein the collimator comprises a lens set.

8. The system as set forth in claim 7 wherein the lens set comprises first and second cylindrical lenses positioned at right angles with respect to one another.

9. The system as set forth in claim 1 further comprising a collimator for collimating the paths of at least one of the first laser beam and the second laser beam.

10. The system as set forth in claim 9 wherein the collimator comprises a lens set.

11. The system as set forth in claim 10 wherein the lens set comprises first and second cylindrical lenses positioned at right angles with respect to one another.

12. The system as set forth in claim 1 wherein the controller is connected to a distributed computer network.

13. The system as set forth in claim 12 wherein the distributed computer network comprises:

interconnected network servers or routers located remote from the controller and in communication therewith; and a plurality of electronic media devices in communication with the servers and routers.

14. The system as set forth in claim 1 wherein at least one beam deflector includes at least two beam deflectors.

15. A system for forming interference patterns on the surface of a workpiece, the system comprising:

a laser generating a laser beam;

a beam splitter dividing the laser beam into a first laser beam and a second laser beam;

a controller providing as output at least one control signal; and at least one beam deflector receptive of the first and second laser beams guiding the first and second laser beams along different paths to a prescribed pixel location on the surface of the workpiece, thereby combining the first and second laser beams at a prescribed azimuthal direction and included angle;

wherein at least one beam deflector is receptive of the at least one control signal thereby controllably deflecting at least one of the first laser beam and the second laser beam to the prescribed pixel location.

16. The system as set forth in claim 15 wherein the laser comprises a Nd:YAG laser.

17. The system as set forth in claim 15 wherein the at least one beam deflector receptive of the at least one control signal comprises at least one mirror controllably positioned to deflect the first laser beam or the second laser beam in a prescribed coordinate system.

18. The system as set forth in claim 15 wherein at least one other beam deflector of the at least one beam deflector receptive of the first and second laser beams includes a mirror fixed about the axes thereof to deflect the first laser beam or the second laser beam in a prescribed coordinate system.

19. The system as set forth in claim 15 further comprising a focusing element for focusing at least one of the first laser beam and the second laser beam to the prescribed pixel location.

20. The system as set forth in claim 19 further comprising a collimator for collimating the paths of at least one of the first laser beam and the second laser beam.

21. The system as set forth in claim 20 wherein the collimator comprises a lens set.

22. The system as set forth in claim 21 wherein the lens set comprises first and second cylindrical lenses positioned at right angles with respect to one another.

23. The system as set forth in claim 15 further comprising a collimator for collimating the paths of at least one of the first laser beam and the second laser beam.

24. The system as set forth in claim 23 wherein the collimator comprises a lens set.

25. The system as set forth in claim 24 wherein the lens set comprises first and second cylindrical lenses positioned at right angles with respect to one another.

26. The system as set forth in claim 15 wherein the controller is connected to a distributed computer network.

27. The system as set forth in claim 26 wherein the distributed computer network comprises:

interconnected network servers or routers located remote from the controller and in communication therewith; and a plurality of electronic media devices in communication with the servers and routers.

28. The system as set forth in claim 15 wherein at least one beam deflector includes at least two beam deflectors.

29. The system as set forth in claim 1 wherein the at least one beam deflector receptive of the first and second laser beams comprises at least one of a galvanometer, an acousto-optic modulator and a piezoelectric modulator.

30. The system as set forth in claim 15 wherein the at least one beam deflector receptive of the first and second laser beams comprises at least one of a galvanometer, an acousto-optic modulator and a piezoelectric modulator.

31. The system as set forth in claim 1 wherein the at least one other beam deflector of the at least one beam deflector receptive of the first and second laser beams includes a prism.

32. The system as set forth in claim 15 wherein the at least one other beam deflector of the at least one beam deflector receptive of the first and second laser beams includes a prism.

* * * * *